United States Patent [19]

Gullichsen et al.

[11] Patent Number: 4,812,207
[45] Date of Patent: Mar. 14, 1989

[54] METHOD OF REMOVING LIGNIN FROM BLEACH PLANT EFFLUENTS

[75] Inventors: Johan Gullichsen, Sjundeå; Pertti Hynninen, Helsinki, both of Finland

[73] Assignee: A. Ahlstrom Corporation, Karhula, Finland

[21] Appl. No.: 122,598

[22] Filed: Nov. 18, 1987

Related U.S. Application Data

[63] Continuation of Ser. No. 882,923, filed as PCT FI85/00091 on Nov. 15, 1985, published as WO86/03236 on Jun. 5, 1986, abandoned.

[30] Foreign Application Priority Data

Nov. 19, 1984 [FI] Finland ............................. 844532

[51] Int. Cl.⁴ .................. C02F 1/58; D21C 11/00
[52] U.S. Cl. ................................. 162/29; 162/38; 162/39; 210/713; 210/724; 210/726; 210/928
[58] Field of Search ............... 162/29, 38, 39, 190, 162/16; 210/724, 726, 713, 928

[56] References Cited

U.S. PATENT DOCUMENTS

| | | | |
|---|---|---|---|
| 3,627,679 | 12/1971 | Fuller | 162/29 |
| 4,179,329 | 12/1979 | Svarz | 162/29 |
| 4,420,369 | 12/1983 | Eaton et al. | 210/928 |
| 4,490,257 | 12/1984 | Becker | 162/29 |

OTHER PUBLICATIONS

Rytholm "Pulping Processes"; Interscience Pub., New York, Sep. 1967 p. 849.
Fursell, "New Method of Fiber Recovery From Pulp & Paper Waste Sludge", *Paper Trade Journal*, Mar. 8, 1971 (162-190).

*Primary Examiner*—Steve Alvo
*Attorney, Agent, or Firm*—Nixon & Vanderhyde

[57] ABSTRACT

A method of removing lignin from bleach plant effluents by using cellulose fibres. The method comprises an acidous phase during which sludge containing cellulose fibres is added to the acidous effluent, and an alkaline phase during which alkaline waste water is added to the effluent-sludge solution. A portion of the produced fraction containing fibres is recirculated to the acidous phase for reuse of the fibres.

10 Claims, 1 Drawing Sheet

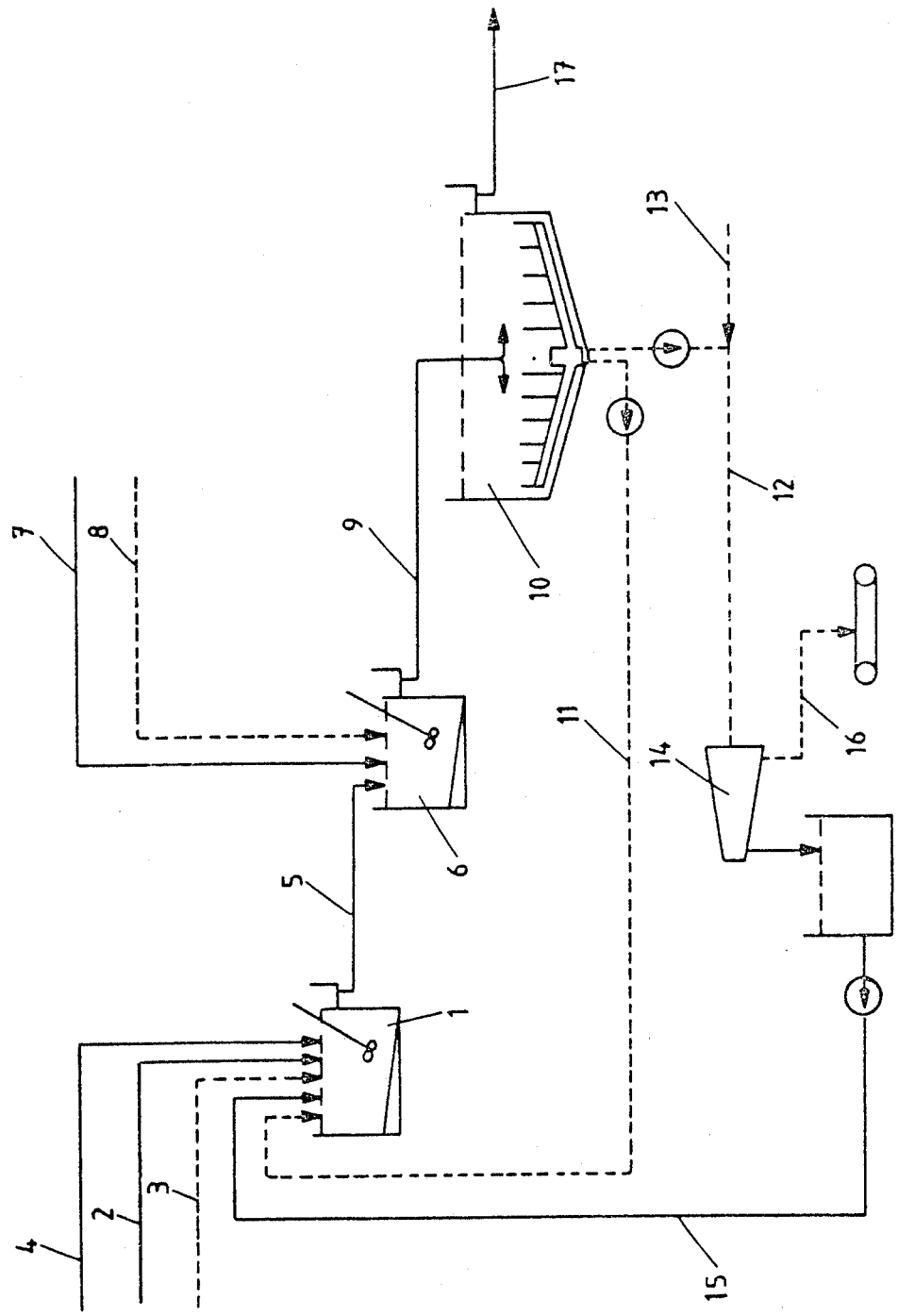

METHOD OF REMOVING LIGNIN FROM BLEACH PLANT EFFLUENTS

This is a continuation of application Ser. No. 882,923, filed as PCT FI85/00091 on Nov. 15, 1985, published as WO86/03236 on Jun. 5, 1986, now abandoned.

The present invention relates to a method of removing lignin from bleach plant effluents by using cellulose fibres.

Various precipitating chemicals, such as soluble iron and aluminium compounds and calcium salts, have been tested and used in cleaning bleach plant effluents. As a result, a particularly efficient decolorizing has been reached and also several other detrimental properties of the effluent have been decreased.

Despite of the many advantages of the methods they have not been commonly employed. One of the various reasons for this are the relatively high costs, in general of the order of 30–40 FIM/t cellulose or more.

D. C. Eaton, Hm. Chang and T. K. Kirk suggest in their article "Kraft bleach plant effluent can be decolorized using the synergistic effects of cations solubilized by acidification of waste slugde" published in the Tappi, May 1982, Vol 65, No. 5, that by acidifying the sludge from a paper mill, e.g. aluminium, iron and calcium compounds are created in the solution. When alkaline bleach water is added in the solution colorful compounds are precipitated. An increase in the pH of the effluent precipitates further colored material. The sludge is separated from water by filtering.

Finnish published patent applicatiton No. 49331 discloses a method of decolorizing the effluents of a cellulose mill, in particular the effluents from the bleaching department of a sulphate cellulose mill, through a layer of calcium hydroxide.

Finnish published patent applicatiton No. 50553 discloses a method of removing organic color material from the effluents of a sulphate cellulose digester by which method the colored material is precipitated with lime in the presens of an adequate amount of cellulose fibres to bring about the precipitation.

The amount and the properties of the effluents of cellulose mills vary depending on the digestion and bleaching process and the raw-material used.

One of the charateristic features of displacement bleaching used in a sulphate cellulose mill is that bleaching carried out by normal bleaching chemicals and sequenses requires very little fresh water. Thus the effluent amounts are at the present of the order of 10–20 $m^3/t$ cellulose when bleaching hardwood pulp, and 13–15 $m^3/t$ cellulose when bleaching softwood pulp. In tower and filter bleaching the effluent amounts are 2–3 times larger which is mainly due to the materials used in the constructions. The small effluent amount of the displacement bleaching also means that the waste substances are fairly concentrated.

The object of the present invention is to provide a method of efficient lignin removal which is in particular advantageous in the treatment of effluents from displacement bleach plants where it decreases the amount of the dissolved organic material by 30–50%. The capital and running costs of the method according to the present invention are low.

The method of the present invention is characterized by the feature that it comprises an acidous phase, during which fibrous sludge is added to acidous effluent, and an alkaline phase during which alkaline waste water is added to the effluent-sludge solution after which the fraction containing the main portion of the fibres is separated and a portion of it supplied into the acidous phase.

Laboratory tests have shown that large amounts of organic compounds are precipitated by combining the acidous and the alkaline bleach water of a displacement bleaching process. The amount of the precipitated organic material is 10–20% (pine) or 5–10% (birch) of the total dissolved material. Precipitation does not take place in dilute bleaching waters. The main substances precipitated are lignin compounds of different molecular size. The molecular size of the main portion of the precipitated lignin is larger than 5000. The molecular size of the remaining dissolved lignin is between 500 and 2000.

The invention is described by the followig examples:

EXAMPLE 1

In tests performed with effluent from a displacement bleaching process, both waste sludge from a paper mill and artificial sludges made by adding chemicals to bleached cellulose were used. The sludge was acidified with acidous waste water fraction while the pH was 1.6–3.0. The treatment lasted for 2–5 minutes. After this an alkaline waste water fraction was introduced into the solution of effluent and sludge. Finally the pH of the solution was adjusted to the range of 5.5–6.5 by adding calcium oxide or calcium hydroxide. The precipitated organic substance and fibres were bound to each other and the dewatering properties of the sludge were improved by adding 1–4 kg cationic polymer/$m^3$ effluent. Centrifuging was found to be the best method of separating water from the sludge. It was also demonstrated that the effluent from a paper mill can be reused at least 8–10 times which reduces the amount of the fibre sludge to be used. The results of the treatment indicated a decolorization of the effluent by 50–80% and a reduction of the chemical oxygen demand (COD) and the total organic coal (TOC) by 40–50% when the fibre amount was 2 kg/$m^3$ or more when bleach plant effluents of pine cellulose were treated. The corresponding figures with birch cellulose were 30–50% and 20–40%.

EXAMPLE 2

Based on the performed experiments the process chart presented in the attached drawing has resulted. The chart is applicable in the treatment of bleach plant effluents of both the displacement bleaching process and other concentrated bleaching effluents.

In the drawing the numeral 1 refers to a mixing vessel of an acidous phase. Acidous effluent 2 of the chlorination phase and the dioxide phase of a displacement bleaching process and sludge 3, which contains fibres and possibly also chemicals and is separated in the effluent treatment plant of a paper or cellulose mill, are supplied to the vessel 1. Also calcium 4 may be added to the vessel for pH regulation. The effluent-sludge solution 5 is brought into an alkaline phase mixing vessel 6 into which also alkaline effluent of the displacement bleaching and possibly also alkaline effluent 7 of the hypo phase. Further, cationic polymer 8 is added into the solution. The effluent-sludge solution 9 from the vessel 6 is passed to a sedimentation basin 10 where organic material and fibres are precipitated. A portion 11 of the sludge precipitated in the sedimentation basin is supplied to the mixing vessel 1 of the acidous phase for reuse of the fibres, and another portion 12 of the sludge, to which cationic polymer 13 may be added, to a centrifuge 14 for dewatering. The separated water 15 is passed to the mixing vessel 1, the solid material 16 is removed from the process. The sedimented effluent 17 is further transported for biological treatment.

EXAMPLE 3

For the lignin removal of the displacement bleach plant effluents of a mill producing 700 t cellulose/24 hours, the following main dimensions are applicable:

| effluent amount | | |
|---|---|---|
| acidous fraction | m³/h | 300 |
| alkaline fraction | m³/h | 150 |
| sludge amount (added and removed) | kg/h | 150 |
| sludge to be recirculated | kg/h | 1100 |
| polymer amount | kg/h | 0,5–1 |
| volume of the acidous effluent mixing vessel | m³ | 10 |
| volume of the alkaline effluent mixing vessel | m³ | 15 |
| sedimentation basin | | |
| volume | m³ | 1350 |
| area | m² | 350 |

The invention is not limited to the embodiment presented here as an example, only, but various modifications and applications of it are possible within the scope of protection defined by the patent claims.

We claim:

1. A method of removing lignin from bleach plant effluents, comprising the steps of:
   in an acidous stage, acidifying a sludge containing cellulose fibers, utilizing acidous bleach plant effluent, so as to produce an effluent-sludge solution having a pH in the range of 1.6–3.0, and
   in an alkaline stage, adding alkaline bleach water to the acidous effluent-sludge solution, thereby causing lignin present in said effluent sludge to be bound to said fibers;
   separating a main portion of the fibers, with lignin bound thereto, from the alkaline treated acidous effluent-sludge solution; and recirculating a portion of the separated fiber-containing portion of the effluent-sludge solution to the acidous stage to reuse the fibers.

2. A method as recited in claim 1 wherein said separation step is accomplished by precipitation of the fiber containing portion in a sedimentation basin.

3. A method as recited in claim 1 wherein the effluents treated are waste water from displacement bleach plants.

4. A method as recited in claim 1 wherein the effluents treated are concentrated waste waters.

5. A method as recited in claim 1 wherein the acidified effluent comprises approximately two-thirds the amount of the total effluent.

6. A method as recited in claim 1 comprising the further step of adding a cationic polymer to the effluent during the addition of alkaline bleach water thereto.

7. A method as recited in claim 6 wherein the amount of cationic polymer added is about 1–4 grams per cubic meter of effluent to be treated.

8. A method as recited claim 2 wherein the amount of fiber supplied to the acidous phase is at least two kilograms per cubic meter of effluent to be treated.

9. A method as recited in claim 1 wherein the amount of fiber supplied to the acidous phase is at least two kilograms per cubic meter of effluent to be treated.

10. A method as recited in claim 9 wherein the acidified effluent comprises approximately two-thirds the amount of the total effluent.

* * * * *

UNITED STATES PATENT AND TRADEMARK OFFICE
CERTIFICATE OF CORRECTION

PATENT NO. : 4,812,207

DATED : March 14, 1989

INVENTOR(S) : GULLICHSEN et al.

It is certified that error appears in the above-identified patent and that said Letters Patent is hereby corrected as shown below:

The assignee on the cover sheet of the patent should read Kamyr AB, Karlstad, Sweden.

Signed and Sealed this

Fifth Day of December, 1989

Attest:

JEFFREY M. SAMUELS

Attesting Officer     Acting Commissioner of Patents and Trademarks